(12) United States Patent
Willats et al.

(10) Patent No.: US 10,544,724 B2
(45) Date of Patent: Jan. 28, 2020

(54) VEHICLE EXHAUST SYSTEM COMPONENT HAVING AN INSULATING HEAT SHIELD ASSEMBLY WITH ENCAPSULATED POCKETS

(71) Applicant: Faurecia Emissions Control Technologies, USA, LLC, Columbus, IN (US)

(72) Inventors: Robin Willats, Columbus, IN (US); Jerome Brian Hornback, Indianapolis, IN (US); John G. Rohde, Columbus, IN (US); Thibaut Contremoulins, Belfort (FR); Maria Saur, Augsburg (DE)

(73) Assignee: Faurecia Emissions Control Technologies, USA, LLC, Columbus, IN (US)

( * ) Notice: Subject to any disclaimer, the term of this patent is extended or adjusted under 35 U.S.C. 154(b) by 0 days.

(21) Appl. No.: 16/085,269

(22) PCT Filed: Mar. 23, 2017

(86) PCT No.: PCT/US2017/023715
§ 371 (c)(1),
(2) Date: Sep. 14, 2018

(87) PCT Pub. No.: WO2017/165588
PCT Pub. Date: Sep. 28, 2017

(65) Prior Publication Data
US 2019/0055876 A1 Feb. 21, 2019

Related U.S. Application Data

(60) Provisional application No. 62/312,541, filed on Mar. 24, 2016.

(51) Int. Cl.
*F01N 13/14* (2010.01)
*F01N 3/20* (2006.01)
(Continued)

(52) U.S. Cl.
CPC ......... *F01N 13/141* (2013.01); *B01D 53/944* (2013.01); *B01D 53/9418* (2013.01);
(Continued)

(58) Field of Classification Search
CPC .. F01N 53/9418; F01N 3/2066; F01N 3/2892; F01N 13/16; B01D 53/9418
(Continued)

(56) References Cited

U.S. PATENT DOCUMENTS 3,854,888 A * 12/1974 Frietzsche ............ F01N 3/2853
422/171
4,328,187 A * 5/1982 Musall .................... B01J 35/02
422/179
(Continued)

FOREIGN PATENT DOCUMENTS

DE 202014104869 U1 1/2016
EP 2703614 A1 3/2014
(Continued)

OTHER PUBLICATIONS

International Search Report and Written Opinion for PCT/US2017/023713, dated Jun. 28, 2017.
(Continued)

*Primary Examiner* — Tom P Duong
(74) *Attorney, Agent, or Firm* — Carlson, Gaskey & Olds P.C.

(57) ABSTRACT

An exhaust component assembly includes a heat shield and a mounting structure to attach the heat shield to an outer housing of an exhaust component. The mounting structure includes a primary insulator located between an outer sur-
(Continued)

face of the outer housing and an inner surface of the heat shield, and at least one secondary insulator positioned adjacent the primary insulator. The primary insulator comprises a sheet of material including at least one encapsulated insulating cavity.

24 Claims, 11 Drawing Sheets

(51) Int. Cl.
    *F01N 3/28* (2006.01)
    *F01N 13/18* (2010.01)
    *B01D 53/94* (2006.01)
    *F01N 13/16* (2010.01)

(52) U.S. Cl.
    CPC ....... *B01D 53/9477* (2013.01); *F01N 3/2066* (2013.01); *F01N 3/2892* (2013.01); *F01N 13/148* (2013.01); *F01N 13/16* (2013.01); *F01N 13/1805* (2013.01); *F01N 2240/20* (2013.01); *F01N 2260/20* (2013.01); *F01N 2610/02* (2013.01); *F01N 2610/1453* (2013.01)

(58) Field of Classification Search
    USPC ........................................................ 422/179
    See application file for complete search history.

(56) References Cited

U.S. PATENT DOCUMENTS

| | | | | |
|---|---|---|---|---|
| 4,344,922 A * | 8/1982 | Santiago | ............... | F01N 3/2853 422/179 |
| 4,350,664 A * | 9/1982 | Gaysert | ................ | F01N 3/2853 422/179 |
| 5,293,743 A * | 3/1994 | Usleman | ............... | F01N 3/2857 422/179 |
| 5,488,826 A * | 2/1996 | Paas | ..................... | B01D 53/944 422/179 |
| 5,882,608 A | 3/1999 | Sanocki et al. | | |
| 6,041,595 A | 3/2000 | Halimi et al. | | |
| 6,116,022 A * | 9/2000 | Woodward | ............. | B01D 53/94 422/174 |
| 6,438,949 B1 | 8/2002 | Nozaki | | |
| 7,611,561 B2 * | 11/2009 | Hill, Jr. | ................. | F01N 3/0211 422/168 |
| 7,976,788 B2 | 7/2011 | Drost et al. | | |
| 8,424,296 B2 * | 4/2013 | Burgers | ................ | F01N 3/2889 60/298 |
| 8,951,323 B2 | 2/2015 | Kumar | | |
| 2006/0065480 A1 | 3/2006 | Leehaug | | |
| 2014/0196442 A1 | 7/2014 | Katou et al. | | |
| 2014/0342115 A1 | 11/2014 | Sakane et al. | | |
| 2015/0260075 A1 * | 9/2015 | Schweiggart | ......... | F16L 59/029 165/185 |

FOREIGN PATENT DOCUMENTS

| | | |
|---|---|---|
| JP | 2006009693 A | 1/2006 |
| JP | 2007162570 A | 6/2007 |
| WO | 2015012829 A1 | 1/2015 |

OTHER PUBLICATIONS

International Search Report and Written Opinion for PCT/US2017/023715, dated Jun. 28, 2017.

International Search Report and Written Opinion for PCT/US2017/023717, dated Jun. 28, 2017.

International Search Report and Written Opinion for PCT/US2017/023720, dated Jun. 28, 2017.

\* cited by examiner

VEHICLE EXHAUST SYSTEM COMPONENT HAVING AN INSULATING HEAT SHIELD ASSEMBLY WITH ENCAPSULATED POCKETS

RELATED APPLICATION

This application claims priority to U.S. Provisional Application No. 62/312,541, filed Mar. 24, 2016.

BACKGROUND OF THE INVENTION

Vehicles include an exhaust system that transports exhaust gas generated by a combustion engine to a location on the vehicle where the heated exhaust gas can be emitted safely. Exhaust systems can include various combinations of the following components: pipes, tubes, resonators, converters, catalysts, filters, mixers, mufflers, etc. The entire exhaust system becomes very hot after a short period of operation due to the high temperatures generated during the combustion processes that produce the exhaust gas. As such, one or more of the components often utilize an outer heat shield to reduce the overall exposed external surface temperature of the components.

A typical heat shield is a thin sheet of metal that is stamped or otherwise formed to conform generally to the shape of the component to which the heat shield is to be attached, such as a muffler for example. The heat shield may be formed with legs or other structures that provide areas for attaching the heat shield to the muffler. Remaining portions of the heat shield are spaced along an outer surface of the muffler to insulate external areas of the shield from the muffler. The heat shield is typically secured to the muffler by welding; however, other attachment methods, such as straps, rivets, etc. have been used additionally or alternatively.

In certain environments it is important to shield as much of a hot exhaust component as possible. For example, some specifications may require as high as 99% of the outer surface of the component to be less than a specified temperature. This requirement can be difficult to achieve with larger components, and with components having complex shapes. Further, the various attachment structures used to attach the heat shield to the component provide direct conduits for transferring heat to the heat shield, which can make it difficult to maintain a desired low outer surface temperature.

SUMMARY OF THE INVENTION

According to one exemplary embodiment, an exhaust component assembly includes a heat shield and a mounting structure to attach the heat shield to an outer housing of an exhaust component. The mounting structure includes a primary insulator located between an outer surface of the outer housing and an inner surface of the heat shield, and at least one secondary insulator positioned adjacent the primary insulator. The primary insulator comprises a sheet of material including at least one encapsulated insulating cavity.

In another embodiment according to the previous embodiment, the sheet of material comprises an insulating mat wrapped around the outer housing, and wherein the at least one encapsulated insulating cavity comprises a sealed cavity fully encapsulated within the insulating mat.

In another embodiment according to any of the previous embodiments, the sealed cavity is empty.

In another embodiment according to any of the previous embodiments, the sealed cavity is filled with an insulating material.

In another embodiment according to any of the previous embodiments, the insulating material comprises a first insulating material having a first heat transfer coefficient, and wherein the insulating mat comprises a second insulating material having a second heat transfer coefficient that is greater than the first heat transfer coefficient.

In another embodiment according to any of the previous embodiments, the at least one secondary insulator is positioned within the sealed cavity.

In another embodiment according to any of the previous embodiments, the at least one secondary insulator is positioned outside the sealed cavity.

In another embodiment according to any of the previous embodiments, the at least one encapsulated insulating cavity comprise a plurality of discrete encapsulated insulating cavities.

In another exemplary embodiment, a method of assembling a heat shield to an outer housing of an exhaust component assembly includes positioning a primary insulator between an outer surface of the outer housing an inner surface of the heat shield, wherein the primary insulator comprises a sheet of material including at least one fully encapsulated insulating cavity; positioning at least one secondary insulator adjacent the primary insulator; and placing the heat shield over the primary and secondary insulators such that the heat shield is held fixed relative to the outer housing.

These and other features of the present invention can be best understood from the following specification and drawings, the following of which is a brief description.

DETAILED DESCRIPTION

Figure 1:
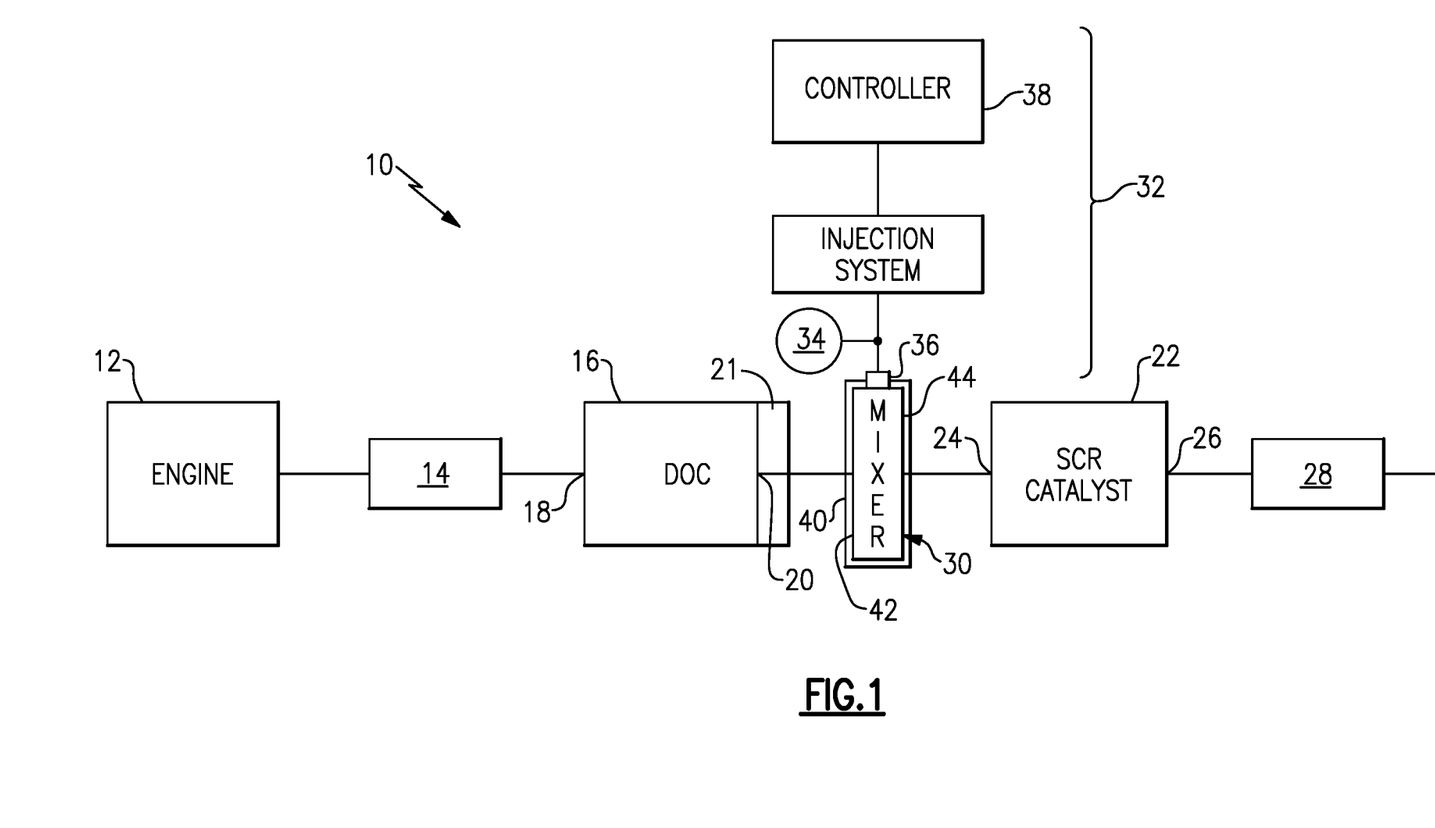
FIG. 1 is a schematic view of a vehicle exhaust system.

FIG. 1 shows a vehicle exhaust system 10 that conducts hot exhaust gases generated by an engine 12 through various upstream exhaust components 14 to reduce emission and control noise as known. Downstream from the engine are various upstream exhaust components 14 that can include one or more of the following in any combination: pipes, filters, valves, catalysts, mufflers, etc. In one example configuration, the various upstream exhaust components 14 direct exhaust gases into a diesel oxidation catalyst (DOC) 16 having an inlet 18 and an outlet 20. Downstream of the DOC 16 there may be a diesel particulate filter (DPF) 21 that is used to remove contaminants from the exhaust gas as known.

Downstream of the DOC 16 and optional DPF 21 is a selective catalytic reduction (SCR) catalyst 22 having an inlet 24 and an outlet 26. The outlet 26 communicates exhaust gases to downstream exhaust components 28. Optionally, component 22 can comprise a catalyst that is configured to perform a selective catalytic reduction function and a particulate filter function. The various downstream exhaust components 28 can include one or more of the following in any combination: pipes, filters, valves, catalysts, mufflers, etc. The components shown in FIG. 1 can be mounted in various different configurations and combinations dependent upon vehicle application and available packaging space.

In one example configuration, a mixer 30 is positioned downstream from the outlet 20 of the DOC 16 or DPF 21 and upstream of the inlet 24 of the SCR catalyst 22. The mixer 30 is used to generate a swirling or rotary motion of the exhaust gas. Any type of mixing element can be used, such as that set forth in US 2012/0216513 for example, which is assigned to the assignee of the present invention and is herein incorporated by reference. An injection system 32 is used to inject a reducing agent, such as a solution of urea and water for example, into the exhaust gas stream upstream from the SCR catalyst 22 such that the mixer 30 can mix the urea and exhaust gas thoroughly together. The injection system 32 includes a fluid supply 34, a doser 36, and a controller 38 that controls injection of the urea as known. Such a system in combination with a mixer is disclosed in U.S. application Ser. Nos. 14/737,533 and 14/737,546 for example, which are assigned to the assignee of the present invention and are herein incorporated by reference.

Figure 2A:
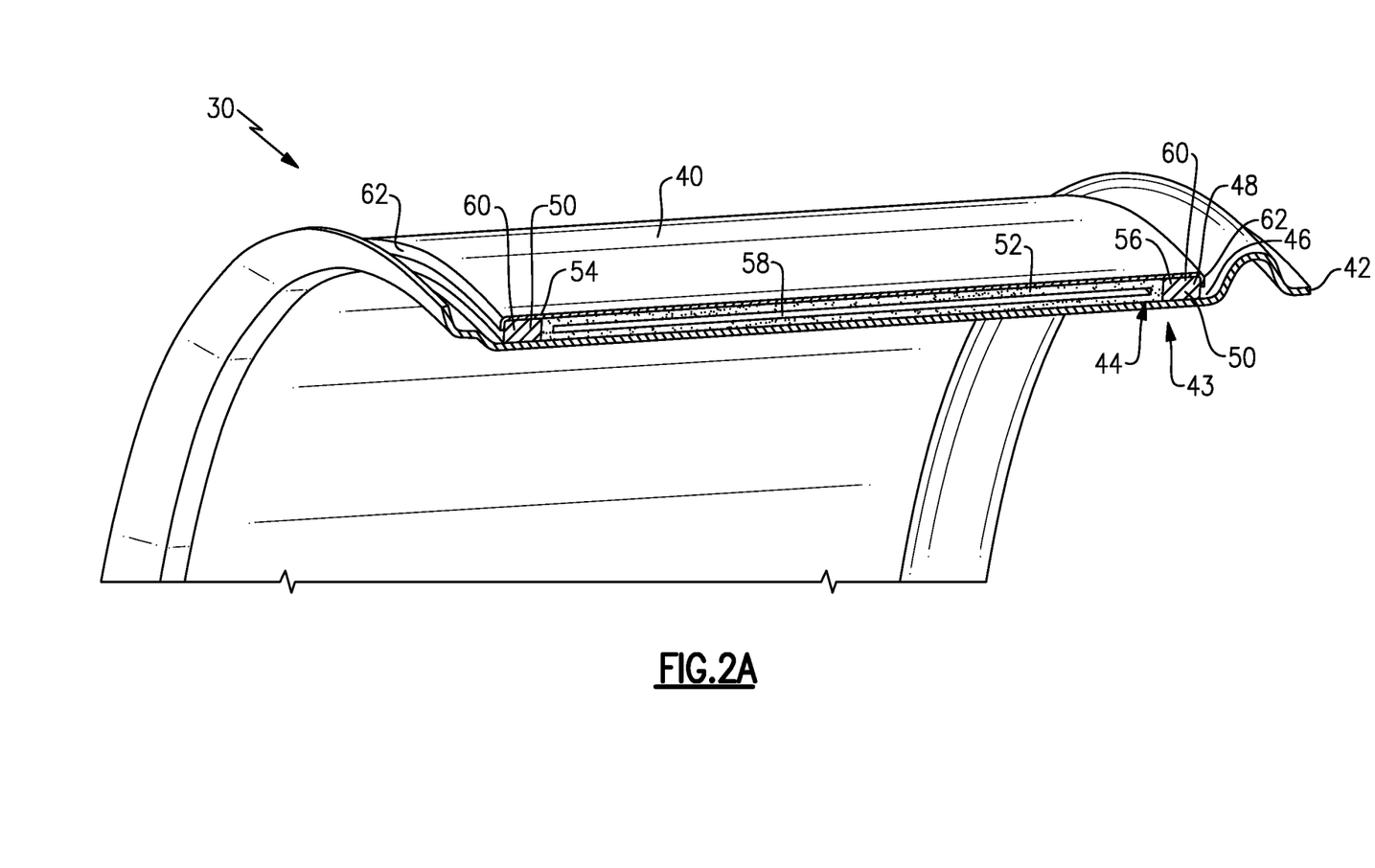
FIG. 2A is a perspective view in section of one example of a mixer and heat shield assembly as used in the vehicle exhaust system of FIG. 2.
Figure 2B:
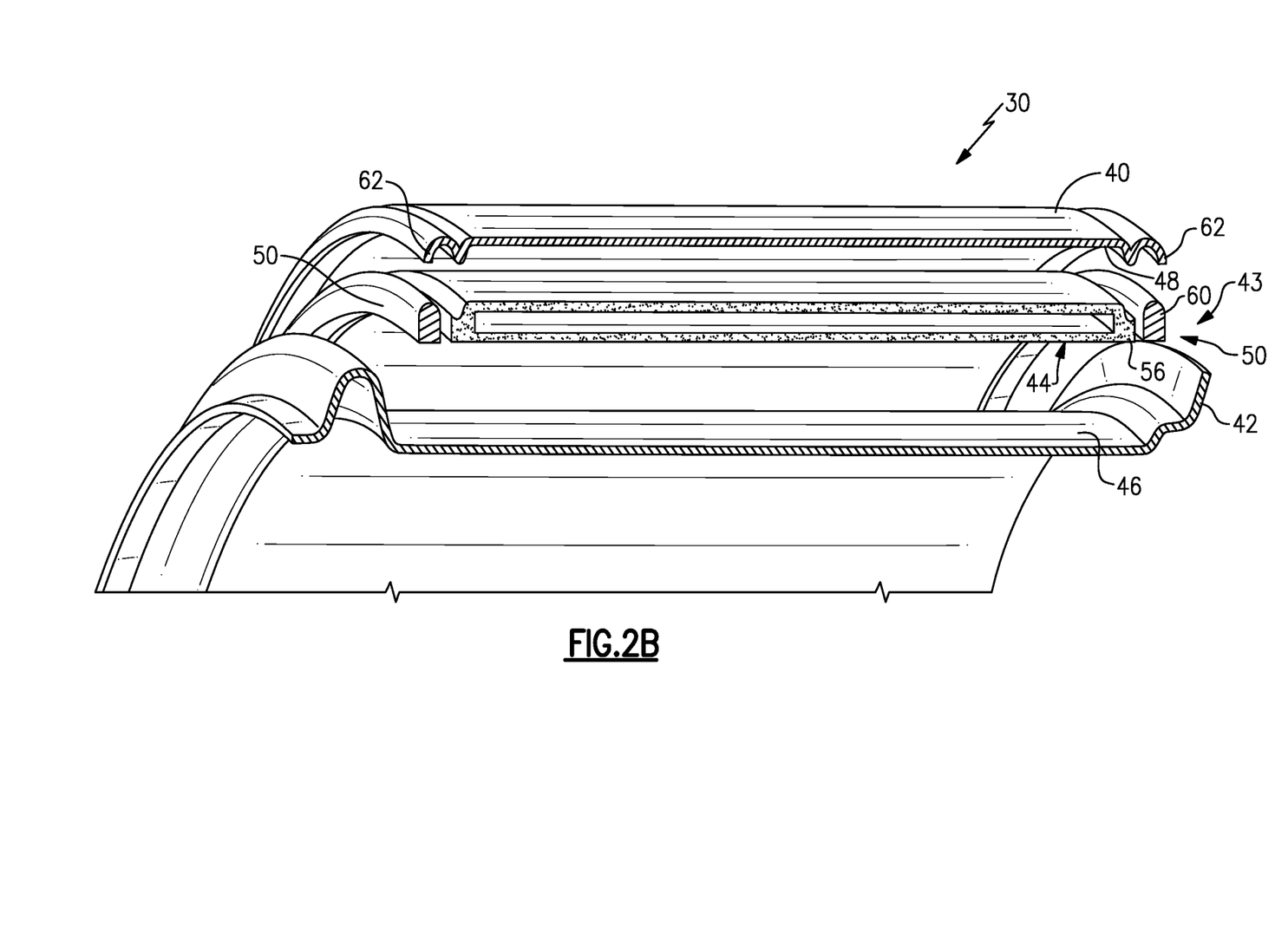
FIG. 2B is an exploded view of FIG. 2A.
Figure 2C:
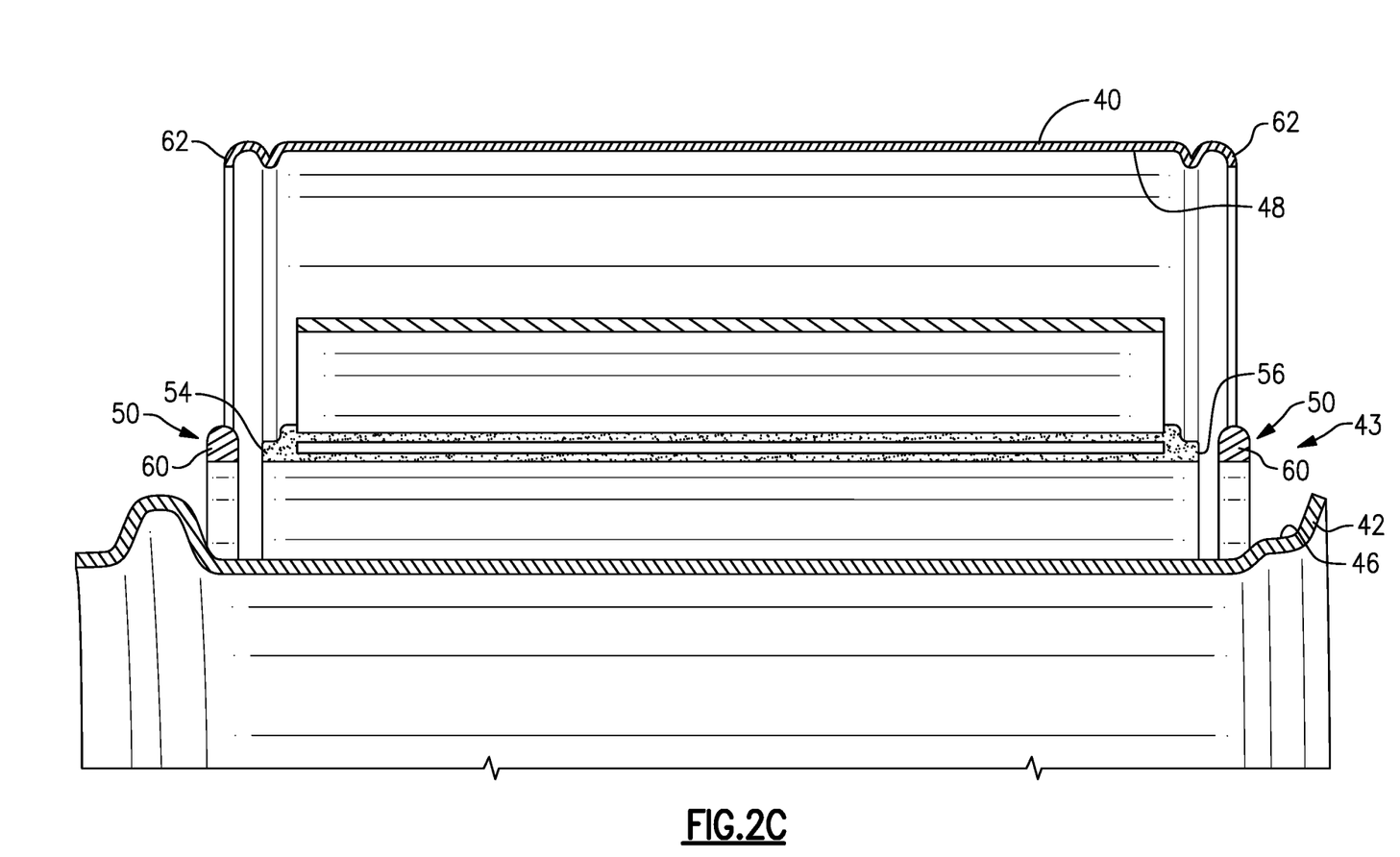
FIG. 2C is an end view of FIG. 2B.
Figure 3:
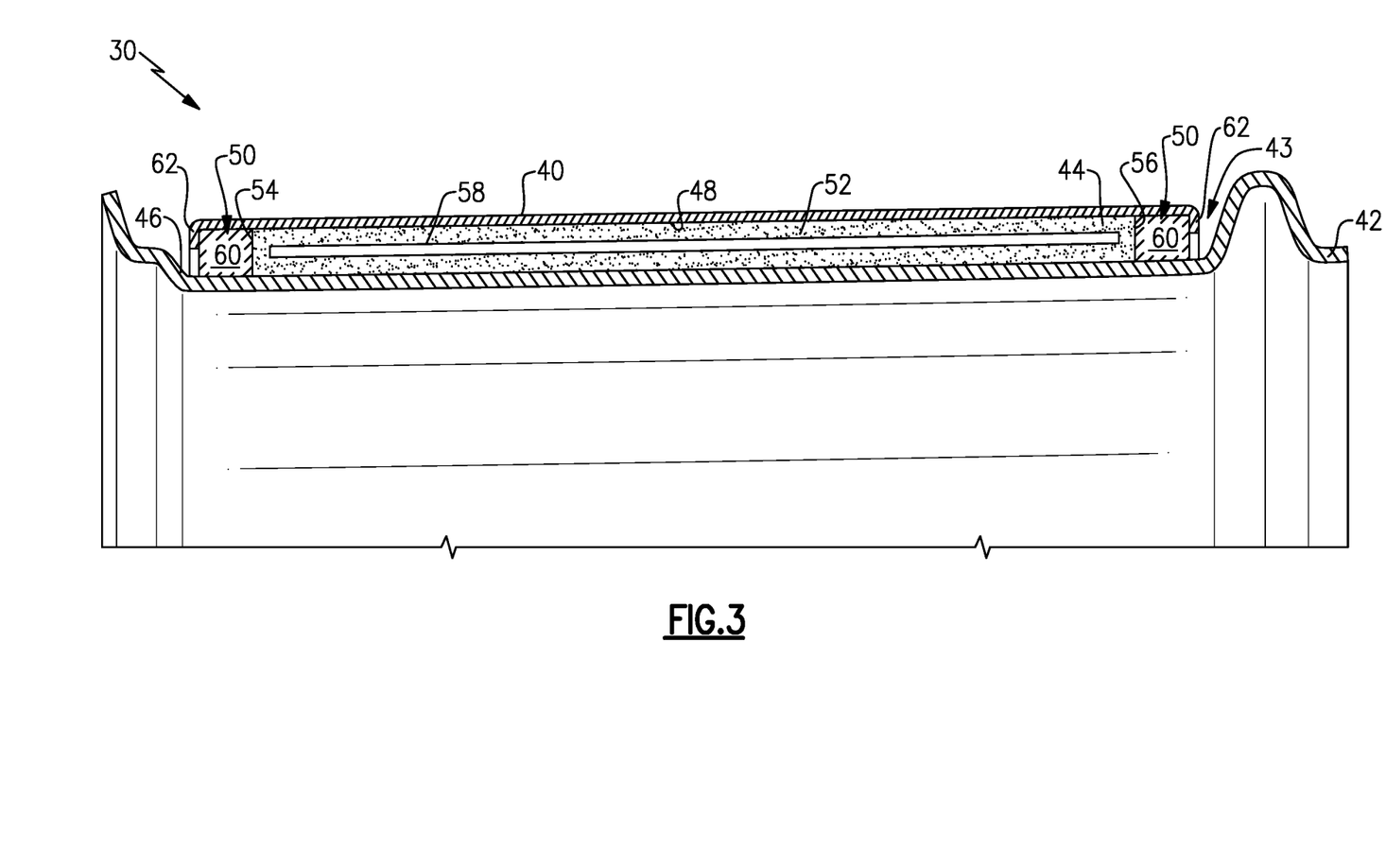
FIG. 3 is a section view the mixer and heat shield assembly of FIG. 2A.
Figure 4:
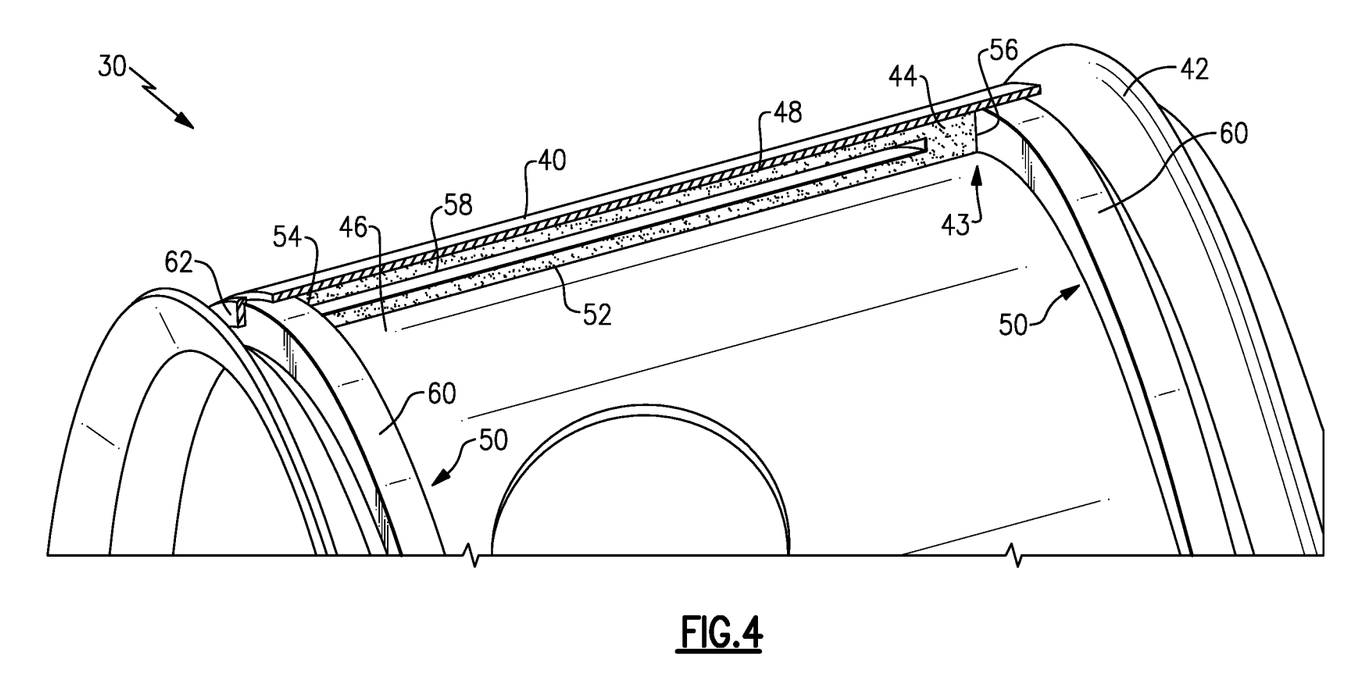
FIG. 4 is a view similar to FIG. 2A but showing secondary insulators of the mixer and heat shield assembly extending circumferentially around a mixer housing.

In one example shown in FIGS. 2-4, the mixer 30 includes a heat shield 40 that is mounted to an outer housing 42 of the mixer 30 using a unique low conductive support mount configuration 43. The low conductive support mount 43 is configured such that the heat internally within the mixer 30 is maintained at the desired temperature levels while the outer surface of the component is maintained at much cooler surface temperatures. In one example embodiment shown in FIGS. 2A-2C, the low conductive support mount 43 comprises a primary insulator 44 that is located between an outer surface 46 of the outer housing 42 and an inner surface 48 of the heat shield 40, and at least one secondary insulator 50 positioned adjacent the primary insulator 44.

In the example shown in FIGS. 2-4, the primary insulator 44 comprises an insulation mat 52 that surrounds the outer surface 46 of the housing 42. The insulation mat 52 has a first edge 54 and a second edge 56 that is opposite the first edge 54. The insulation mat 52 further includes at least one encapsulated insulating cavity 58. The cavity 58 is fully encapsulated by material of the insulation mat 52 to further enhance insulating capability of the low conductive support mount 43. In one example, the encapsulated insulating cavity 58 can be tube gas or vacuum filled to any desired shape and/or size. Further, the encapsulated insulating cavity 58 can be empty, e.g. an air cavity, or can be filled with a higher performance insulating material. This will be discussed in greater detail below.

In one example, the at least one secondary insulator 50 comprises one or more pieces of material, bands, or rings 60 that are used in combination with the insulation mat 52 to mount the heat shield 40 on the housing 42. In the example shown, one ring 60 is placed at the first edge 54 of the mat 52 and another ring 60 is placed at the opposite second edge 56 of the mat 52. As such, in this example, the rings 60 are located externally of the mat 52 and outside of the cavity 58. The heat shield 40 is placed over outer surfaces of the mat 52 and rings 60 and is then compressed radially inward to compress the mat 52 against the housing 42. Edges 62 of the heat shield 40 can be formed around the rings 60 to facilitate holding the rings 60 and mat 52 in place against the mixer 30. The combination of primary 44 and secondary 50 insulators is used to insulate the heat shield 40 from the outer housing 42 by removing direct contact (conduction path) between the housing 42 and heat shield 40, while also maintaining a generally constant gap between them.

The heat shield 40 can be made from a metallic material such as a steel sheet for example, or the heat shield 40 can be made from a non-metallic material such as composite or plastic material, for example. The rings 60 protect the mat 52 and the encapsulated insulating cavity 58, provide structural support for the heat shield 40, and resist movement of the heat shield 40 during vehicle operation. The rings 60 can comprise a band of fiber mat or a fibrous material such as rope, for example. The rings 60 preferably comprise bands of a high-stiffness mat, a rope of braided rope material, a rope of braided wire material, a rope that includes glass fibers, or other similar materials. The rings 60 can be comprised of a compressible or non-compressible material.

In one example, the mat 52 has a first stiffness and the rings 60 have a second stiffness that is greater than the first stiffness. When the rings 60 have a greater stiffness than the mat 52, the rings 60 protect the encapsulated insulating cavity 58 from being crushed in a radial direction when the heat shield 40 is compressed against the rings 60 and mat 52 during assembly. FIG. 4 shows the rings 60 extending around an outer circumference of the mixer housing 42. The rings 60 may extend around the entire circumference, or optionally, only around a portion thereof. FIGS. 3-4 show that edges 62 of the heat shield 40 are formed around outward faces of the rings 60 to facilitate attachment of the heat shield 40 to the mixer 30 in compression. The edges 62 remain spaced apart from the housing 42 such that heat from the housing 42 cannot be directly transferred to the heat shield 40.

Figure 5:
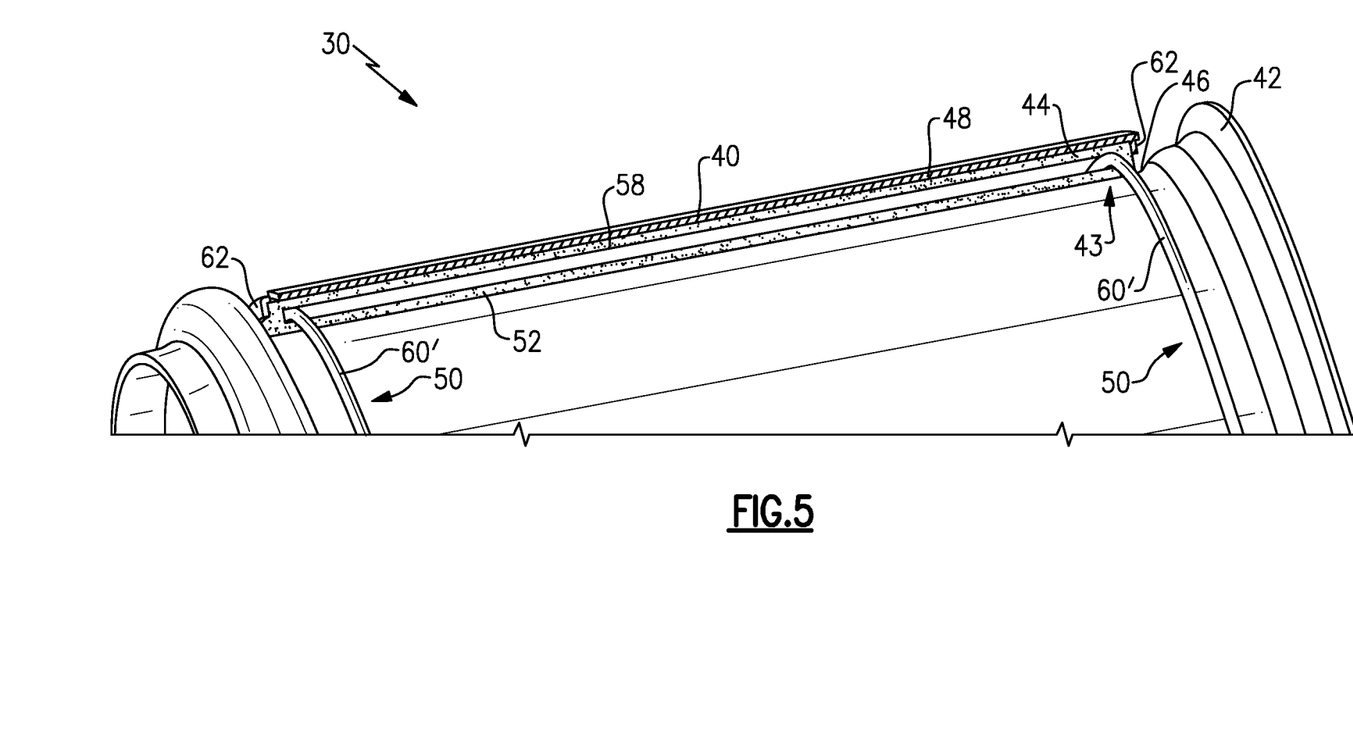
FIG. 5 is a perspective view in partial section of another example of a mixer and heat shield assembly but showing secondary insulators encapsulated in a primary insulator.
Figure 6:
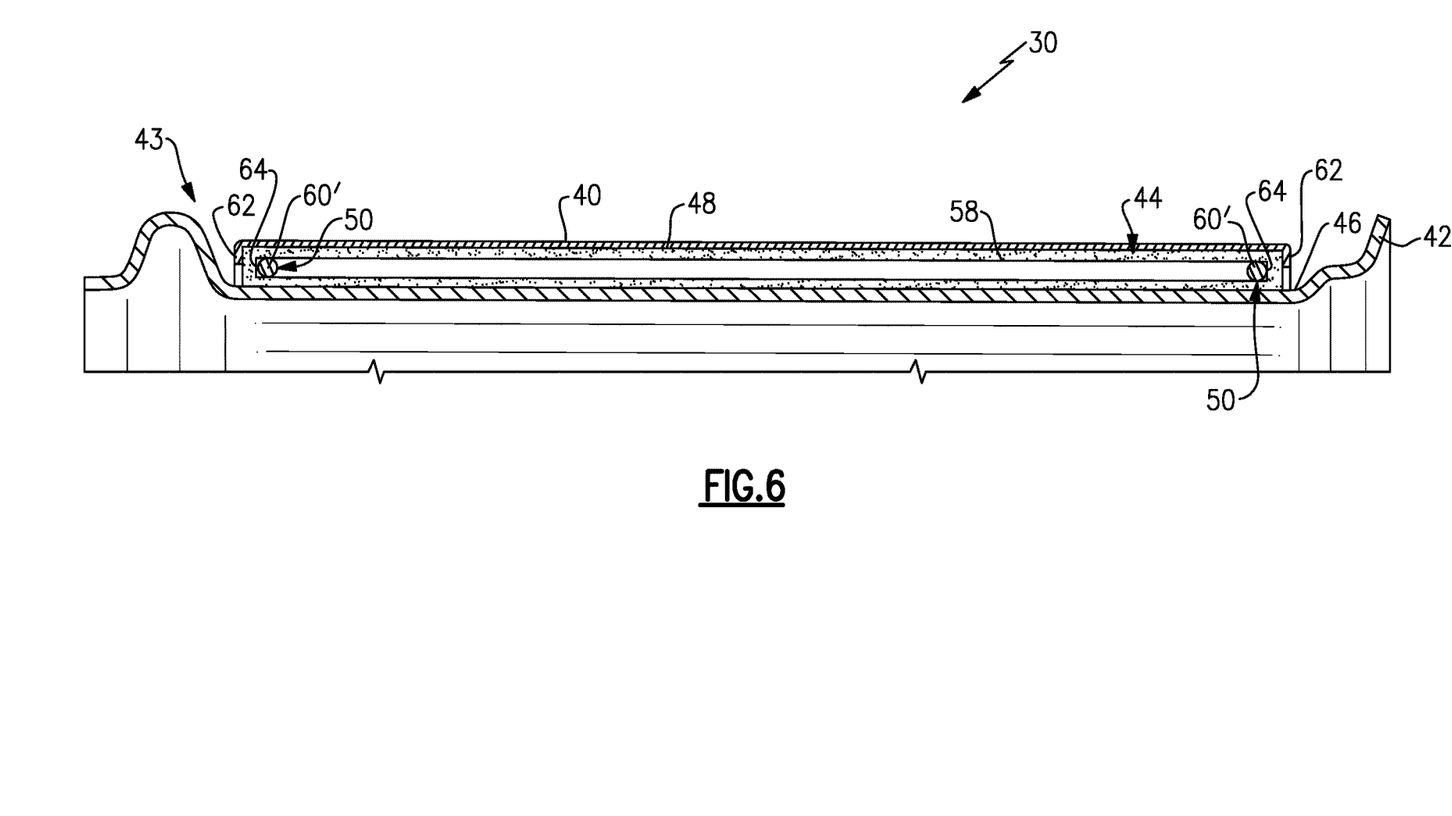
FIG. 6 is a section view of FIG. 5.

FIGS. 5-6 show another example of a heat shield 40 with a low conductive support mount 43. The low conductive support mount 43 includes a primary insulator 44 and one or more secondary insulators 50. The primary insulator 44 comprises the insulation mat 52 that includes the at least one encapsulated insulating cavity 58 as described above. However, in this example, the secondary insulators 50 comprise bands or rings 60' that are located within the encapsulated insulating cavity 58. As such, this configuration provides a fully encapsulated design where cavities 58 and mounting bands or rings 60' are fully encapsulated within material that forms the mat 52.

FIG. 5 shows the rings 60' extending around the circumference of the mixer housing 42. The rings are located at opposing edges 64 of the cavity 58 such that the mat 52 can be held securely in place against the housing 42. As shown in FIG. 6, edges 62 of the heat shield 40 are formed around outward edges 54, 56 of the mat 52 to facilitate attachment of the heat shield 40 to the mixer 30 in compression. In one example, the mat 52 has a first stiffness and the rings 60' have a second stiffness that is greater than the first stiffness. When the rings 60' have a greater stiffness than the mat 52, the rings 60' protect the encapsulated insulating cavity 58 from being crushed in a radial direction when the heat shield 40 is compressed against the rings 60' and mat 52 during assembly.

Figure 13A:
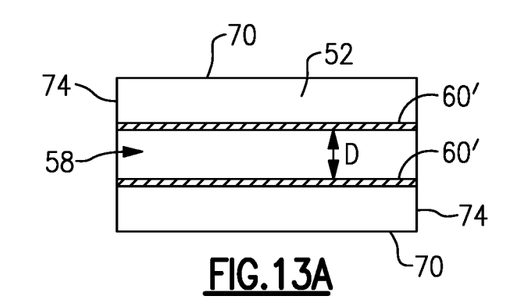
FIG. 13A is a schematic view of an assembly process for the mat and rings of the example shown in FIGS. 5-6.
Figure 13B:
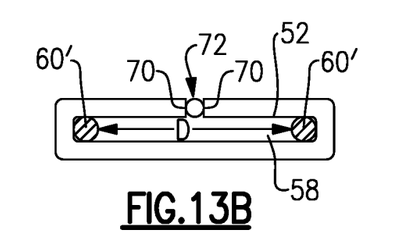
FIG. 13B is a schematic view of the mat and rings of FIG. 13A in a configuration where the mat is folded such that the rings are fully encapsulated within the cavity.

In one example shown in FIGS. 13A-B, the mat 52 is laid flat and ropes or strips of material used to form the first and second rings 60' are laid on top of the mat 52 at locations that are axially spaced inwards from edges 70 of the mat. The first and second rings 60' are axially spaced apart from each other by a distance D that defines the length of the cavity 58. The edges 70 of the mat can then be wrapped around the ring material until the edges 70 are in engagement with each other can be sewn or otherwise attached to each other at seam 72 to form the fully encapsulated cavity 58 with the rings 60' inside the cavity 58. The mat 52 and rings 60' can then be wrapped around the housing 42 with ends 74 being attached to each other to form an annular mat or with the ends being attached to the housing 42 at desired locations.

In each of the examples, the rings 60, 60' provide protection to keep the cavity 58 from being compressed or crushed during assembly of the heat shield 40 onto the mixer 30. Optionally, or in addition to having rings 60, 60' with a higher stiffness than the mat 52, surfaces of the cavity 58 could be coated with a rigidizer. Any type of rigidizing coating capable of withstanding the high temperature levels of the exhaust system can be used.

In each of the examples, the sheet of insulating material of the primary insulator 44 comprises a mat 52. The mat can be comprised of one or more layers of material. Certain layers can provide a more compressible role while other layers can provide a higher quality or level of heat insulation.

Figure 7:
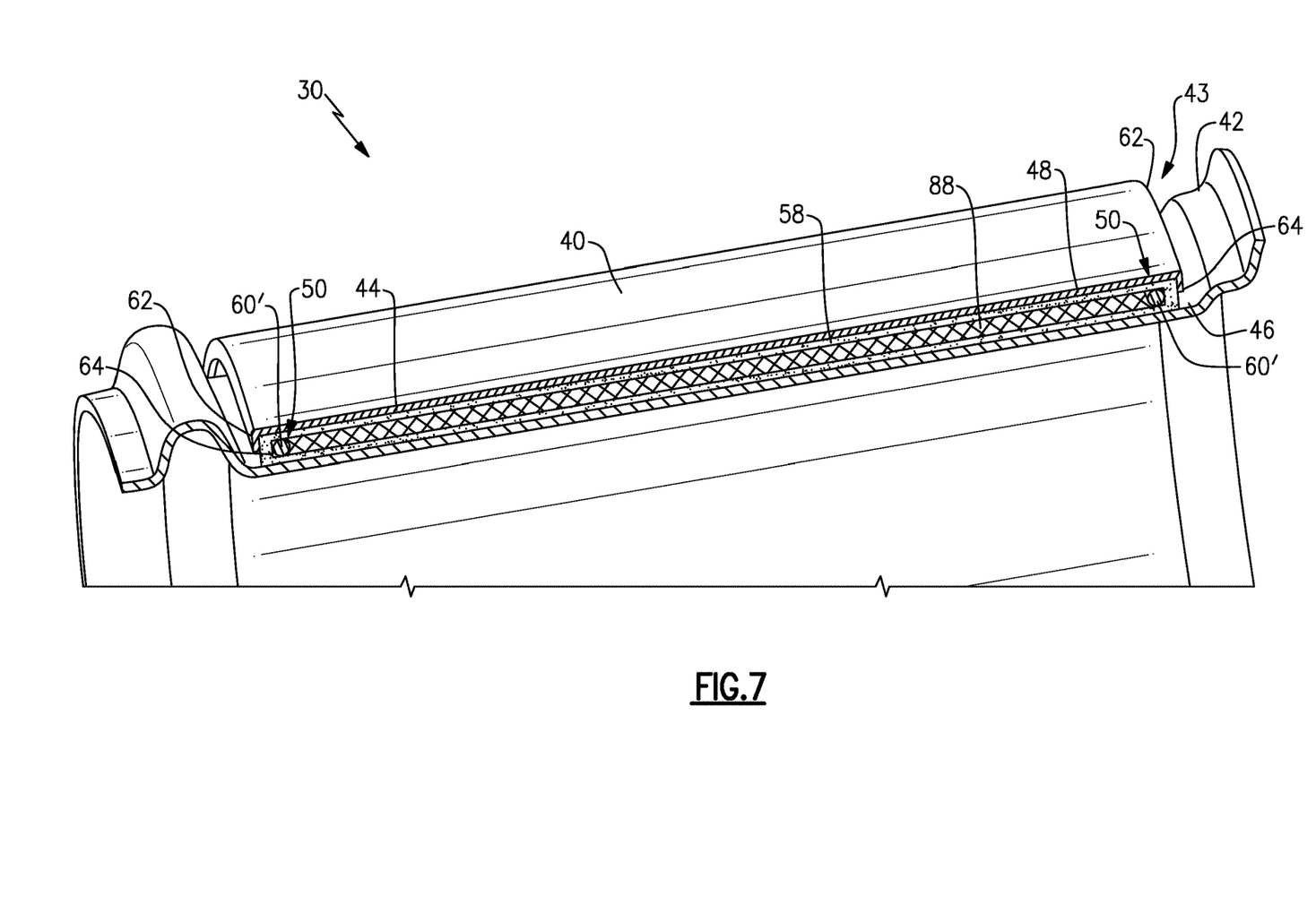
FIG. 7 is a perspective view in section of another example of a mixer and heat shield assembly.

FIG. 7 shows an example where the cavity 58 is filled with a high performance insulating material 88. In one example, the insulating material 88 that fills the cavity 58 comprises a first insulating material having a first heat transfer coefficient and the insulating mat 52 is comprised of a second insulating material having a second heat transfer coefficient that is greater than the first heat transfer coefficient.

In one example, the mat 52 is comprised of at least a type of insulating material such as fiber or foam material for example, and the cavity 58 is filled with a high heat insulation material 88, such as microporous material for example. Other examples of high heat insulation material include, for example, non-fibrous material with a high porosity (microporous), low density aerogels (silica aerogels), porous fibrous material, foams with ceramic content, porous ceramic material (alumina/silica products), or other similar materials. Thus, this example provides multi-layer configuration where the more fragile high heat (high performance) insulation material is fully encapsulated and protected by the more durable fiber or foam material that forms the mat 52. Other examples of multi-layer mats can be found in in co-pending application 16/085232 claiming priority to PCT/2017/023713 filed on Mar. 23, 2017, which is assigned to the assignee of the subject application and is hereby incorporated by reference.

Figure 8:
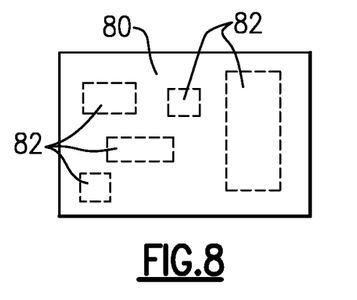
FIG. 8 is a highly schematic representation of a primary insulator including a plurality of discrete encapsulated insulating cavities.
Figure 9:
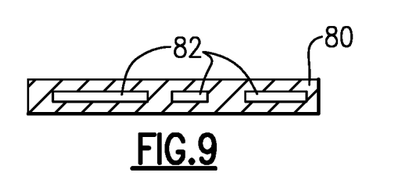
FIG. 9 is a highly schematic section view of a primary insulator including a plurality of discrete encapsulated insulating cavities.

FIG. 8 shows an example of a mat 80 having a plurality of discrete encapsulated insulating cavities 82. In one example, the cavities 82 are located at identified hot spot areas that may vary between different types of exhaust components and/or exhaust applications. The cavities 82 can be empty vacuum formed cavities or filled with high insulating performance material 88 as described above. Further, the cavities 82 can have any shape or size. FIG. 9 shows the mat 80 including discrete and separate cavities 82 located across a cross-section of the mat 80.

Figure 10:
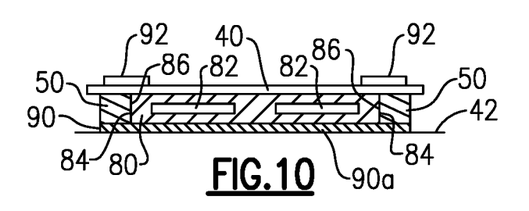
FIG. 10 is a highly schematic section view of a primary insulator including a plurality of discrete encapsulated insulating cavities in combination with secondary insulators located outside of the cavities.
Figure 11:
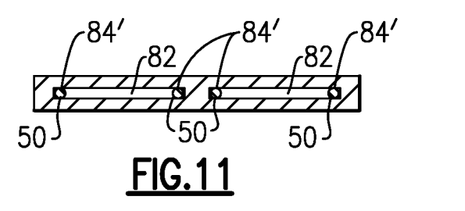
FIG. 11 is a highly schematic section view of a primary insulator including a plurality of discrete encapsulated insulating cavities in combination with secondary insulators located inside of the cavities.

The mat 80 can be used with secondary insulators 50 comprising pieces of material 84 that are positioned on opposing sides 86 of the mat 80 (FIG. 10) or with pieces of material 84' that are fully encapsulated within the cavities 82 (FIG. 11). Further, while each cavity 82 in FIG. 11 is shown as including two pieces of material 84', it should be understood that some cavities 82 may not include any pieces of material 84', some cavities 82 may include only one piece of material 84', or some cavities 82 could include more than two pieces of material 84'. This could also apply to the cavities 58 shown in the examples of FIGS. 5-7. Additionally, in these fully encapsulated configurations, the pieces of material 84' may only extend about a discrete portion of the outer circumference of the mixer 30. These pieces of material 84 may be glued or otherwise fixed within the cavity 82 as needed.

In one example shown in FIG. 10, a support layer 90 for the mat 80 and/or pieces of material 84 is provided. In one example, the support layer 90 comprises a layer of adhesive material 90a that holds the mat 80 and/or pieces of material 84 in place until an attachment structure 92 such as a portion of the heat shield 40, clamps, straps or bolts, for example, are installed to hold the heat shield 40 in compression against the housing 42. Optionally, the pieces of material 84 and mat 52 can be attached to the support layer 90 to form an assembly that is then wrapped around the housing 42 as a unit. Further, the support layer 90 shown in FIG. 10 can be used in any of the examples disclosed herein. Use of the support layer 90 provides the benefit of a simple and effective installation of the heat shield 40.

In each of the examples, the pieces of material 84, 84', bands, or rings 60, 60" can be sealed or unsealed structures depending upon the desired specifications. Ideally, the pieces of material 84, 84', bands, or rings 60, 60' should provide structural support, insulation, and sealing to the heat shield 40 and component assembly. When the pieces of material 84, 84', bands, or rings 60, 60' are comprised of a rope made of braided fibers, the rope can be treated with a coating, for example, to be waterproof and to act as a seal. When the pieces of material 84, 84', bands, or rings 60, 60' are comprised of a band or ring made from a mat that is sensitive to water, an additional seal might be needed. This seal can be made of insulating foam or be a gasket made with heat-insulating material, such as mica, for example. Further, the cross-sectional shape of the pieces of material 84, 84', bands, or rings 60, 60' can be circular, oval, square, rectangular, etc. Additionally or alternatively, the cross-sectional shape of the pieces of material 84, 84', bands, or rings 60, 60', can be variable in diameter, area, and shape along the length of the material 84, 84', bands, or rings 60, 60'.

In one example, the pieces of material 84, 84', bands, or rings 60, 60' comprise square or rectangular section braided wire bands that are 10-20 mm in width and which can withstand outer surface temperatures of 500-600 degrees Celsius. The polygonal section braided wire bands should have a high density/low compressibility such that when the bands are compressed they are approximately 7 mm thick in a radial direction. The material should comprise a material with very low thermal conductivity, such as less than 0.1 W/m·K at 600 degrees Celsius, for example.

In one example, the primary heat shield 40 is made of two C-shaped heat shield portions (only one portion is shown in FIG. 2A, for example) that are attached together when a pressure is applied during assembly. The possible types of attachment include clamping, clipping, brazening or welding the two portions together.

Figure 12:
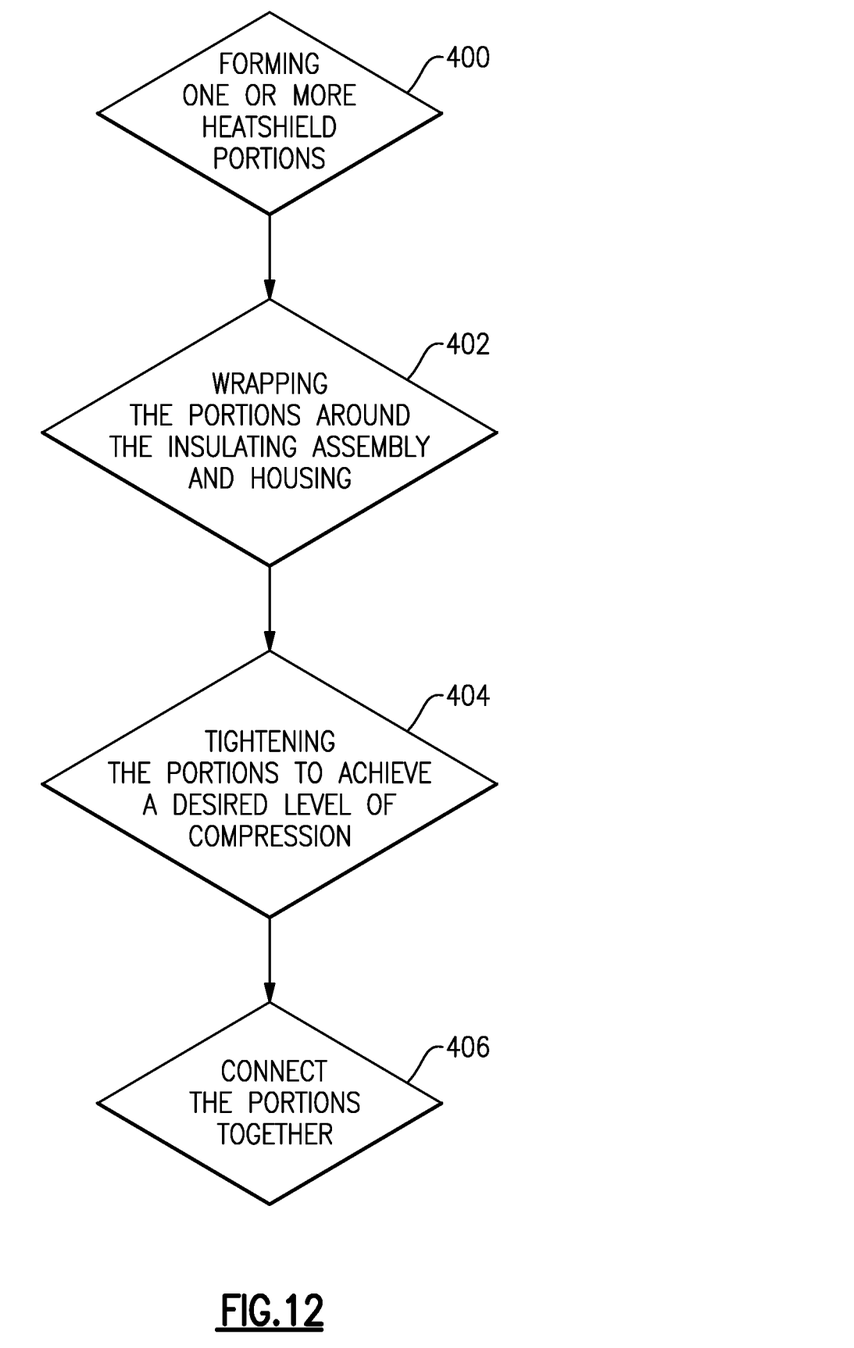
FIG. 12 is a flow chart describing one example method of assembling a heat shield assembly onto an exhaust component.

In one example method using a tourniquet process, the method includes a step of forming 400 (FIG. 12) one or more heat shield portions by pre-rolling the portions, for example, and then wrapping 402 the portions around the internal insulating assembly 44, 50 and mixer housing 42. The portions are then tightened 404 around the internal insulating assembly 44, 50 and are tack welded to each other at a location where the portions overlap with each other. The portions are tightened until a desired level of compressive force is achieved for the subject component application. Next, the heat shield portions are connected to each other 406 at an overlap seam that is sealed via welding or brazing, for example, such that the heat shield 40 is held in compression against the housing 42.

As such, the whole component assembly is held together in compression. The heat shield 40 is put in position at a defined and controlled pressure as discussed above. The heat shield portions are attached together when the pressure is applied. If the compressive force is not sufficient to maintain the assembly in place due to axial loading, some features can be added to the housing 42 to help keep the assembly in place, such as mechanical stops for example. If the compressive force is not sufficient to maintain the assembly in place due to radial loading, additional mount structures 92 (FIG. 10) such as fasteners, straps or clamps can be installed.

It should be understood that while heat shield and unique low conductive support mount configuration 43 are shown in this example as being mounted to a mixer 30, the subject heat shield assembly and associated mounting configuration 43 can be used with any other vehicle exhaust system component as needed. For example, the subject heat shield mounting configurations could be used with mufflers, DOCs, DPFs, tailpipes, etc. Further, the subject heat shield mounting configurations could be used with larger box-shaped system components that include flat sides, where the heat shield would be pre-formed to get in compression.

The subject invention utilizes a unique a mounting structure for a heat shield 40 that comprises a primary insulator 44 in combination with one or more secondary insulators 50 as described above. The primary insulators 44 are used as structural support to attach the heat shield 40 to the outer housing 42. The secondary insulators 50 are configured to hold the heat shield 40 and primary insulator 44 in place relative to the outer housing 42. Exemplary secondary insulators 50 comprise pieces of material, bands or rings that provide for a higher stiffness area than that of the mat.

As discussed above, temperatures at the outer surface of the housing 42 can be as high as 600 degrees Celsius. In each of the disclosed examples, the heat shield assembly 40 and mounting structure 43 maintain as high as 90-99% of an outer surface of the heat shield at a temperature that can be as low as approximately 300 degrees Celsius or even as low as 200 degrees Celsius, for example, which is a significant improvement over existing heat shield configurations.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The invention claimed is:

1. An exhaust component assembly comprising:
   a heat shield; and
   a mounting structure to attach the heat shield to an outer housing of an exhaust component, wherein the mounting structure comprises
   a primary insulator located between an outer surface of the outer housing and an inner surface of the heat shield, wherein the primary insulator comprises a sheet of material including at least one encapsulated insulating cavity, and
   at least one secondary insulator positioned adjacent the primary insulator.

2. The exhaust component assembly according to claim 1 wherein the sheet of material comprises an insulating mat wrapped around the outer housing, and wherein the at least one encapsulated insulating cavity comprises a sealed cavity that is fully encapsulated within the insulating mat.

3. The exhaust component assembly according to claim 2 wherein the sealed cavity is empty.

4. The exhaust component assembly according to claim 2 wherein the sealed cavity is filled with an insulating material.

5. The exhaust component assembly according to claim 4 wherein the insulating material comprises a first insulating material having a first heat transfer coefficient and wherein the insulating mat comprises a second insulating material having a second heat transfer coefficient that is greater than the first heat transfer coefficient.

6. The exhaust component assembly according to claim 5 wherein
   the first insulating material comprises a non-fibrous material with a high porosity, a low density aerogel, a porous fibrous material, a foam material that having a ceramic content, or a porous ceramic material, and
   wherein the second insulating material comprises a fibrous material or a foam material.

7. The exhaust component assembly according to claim 2 wherein the at least one secondary insulator is positioned within the sealed cavity.

8. The exhaust component assembly according to claim 7 wherein the insulating mat is comprised of a first material having a first stiffness and wherein the at least one secondary insulator is comprised of a second material having a second stiffness that is greater than the first stiffness.

9. The exhaust component assembly according to claim 2 wherein the at least one secondary insulator is positioned outside the sealed cavity.

10. The exhaust component assembly according to claim 9 wherein the insulating mat has a first edge and a second edge opposite of the first edge, and wherein the at least one secondary insulator comprises at least a first piece of material positioned at the first edge and a second piece of material positioned at the second edge.

11. The exhaust component assembly according to claim 10 wherein the heat shield is placed over outer surfaces of the first and second pieces of material and the insulating mat and is held in compression against the outer housing by at least one attachment structure.

12. The exhaust component assembly according to claim 2 wherein the heat shield is held in compression against the outer housing, and wherein the at least one secondary insulator comprises first and second rings or bands having a first stiffness and wherein the insulating mat has a second stiffness that is less than the first stiffness such that the secondary insulators prevent the sealed cavity from being crushed in a radial direction by the heat shield.

13. The exhaust component assembly according to claim 1 wherein the at least one encapsulated insulating cavity comprises a plurality of discrete encapsulated insulating cavities.

14. The exhaust component assembly according to claim 1 wherein the heat shield and mounting structure cooperate with each other to maintain more than 90% of an outer surface of the heat shield at a temperature as low as 200 degrees Celsius.

15. The exhaust component assembly according to claim 1 wherein the exhaust component comprises a mixer for exhaust gases and which includes inlet and outlet baffles surrounded by the outer housing, and including an injector mounted to the outer housing to inject a fluid into an internal area between the inlet and outlet baffles to mix with the exhaust gases.

16. A method of assembling a heat shield to an outer housing of an exhaust component assembly comprising the steps of:
 positioning a primary insulator between an outer surface of an outer housing and an inner surface of the heat shield, wherein the primary insulator comprises a sheet of material including at least one fully encapsulated insulating cavity;
 positioning at least one secondary insulator adjacent the primary insulator; and
 placing the heat shield over the primary and secondary insulators such that the heat shield is held fixed relative to the outer housing.

17. The method according to claim 16 wherein the primary insulator comprises an insulating mat and the at least one secondary insulator comprises at least first and second bands or rings, and including the steps of
 wrapping the insulating mat around the outer housing such that the first band or ring is positioned adjacent one edge of the insulating mat and the second band or ring is positioned adjacent an opposite edge of the insulating mat,
 compressing the heat shield against the insulating mat and first and the second bands or rings, and
 holding the heat shield in compression against the outer housing with at least one attachment structure.

18. The method according to claim 17 wherein the first and second bands or rings are located within the fully encapsulated insulating cavity.

19. The method according to claim 17 wherein the first and second bands or rings are located outside of the fully encapsulated insulating cavity.

20. The method according to claim 16 wherein the fully encapsulated insulating cavity is filled with air or is filled with an insulating material having a heat transfer coefficient lower than a heat transfer coefficient of an insulating material of the mat.

21. The method according to claim 16 wherein the primary insulator and the at least one secondary insulator provide structural support to attach the heat shield to the outer housing.

22. The method according to claim 21 wherein the secondary insulator has a greater stiffness than the primary insulator, and including positioning the secondary insulator adjacent to at least one edge of the primary insulator.

23. The exhaust component assembly according to claim 1 wherein the primary insulator and the at least one secondary insulator provide structural support to attach the heat shield to the outer housing.

24. The exhaust component assembly according to claim 23 wherein the secondary insulator has a greater stiffness than the primary insulator, and wherein the secondary insulator is positioned adjacent to at least one edge of the primary insulator.

* * * * *